Aug. 19, 1952     C. J. STALEGO     2,607,075
METHOD AND APPARATUS FOR PRODUCING FINE GLASS FIBERS
Filed March 28, 1947     4 Sheets-Sheet 1
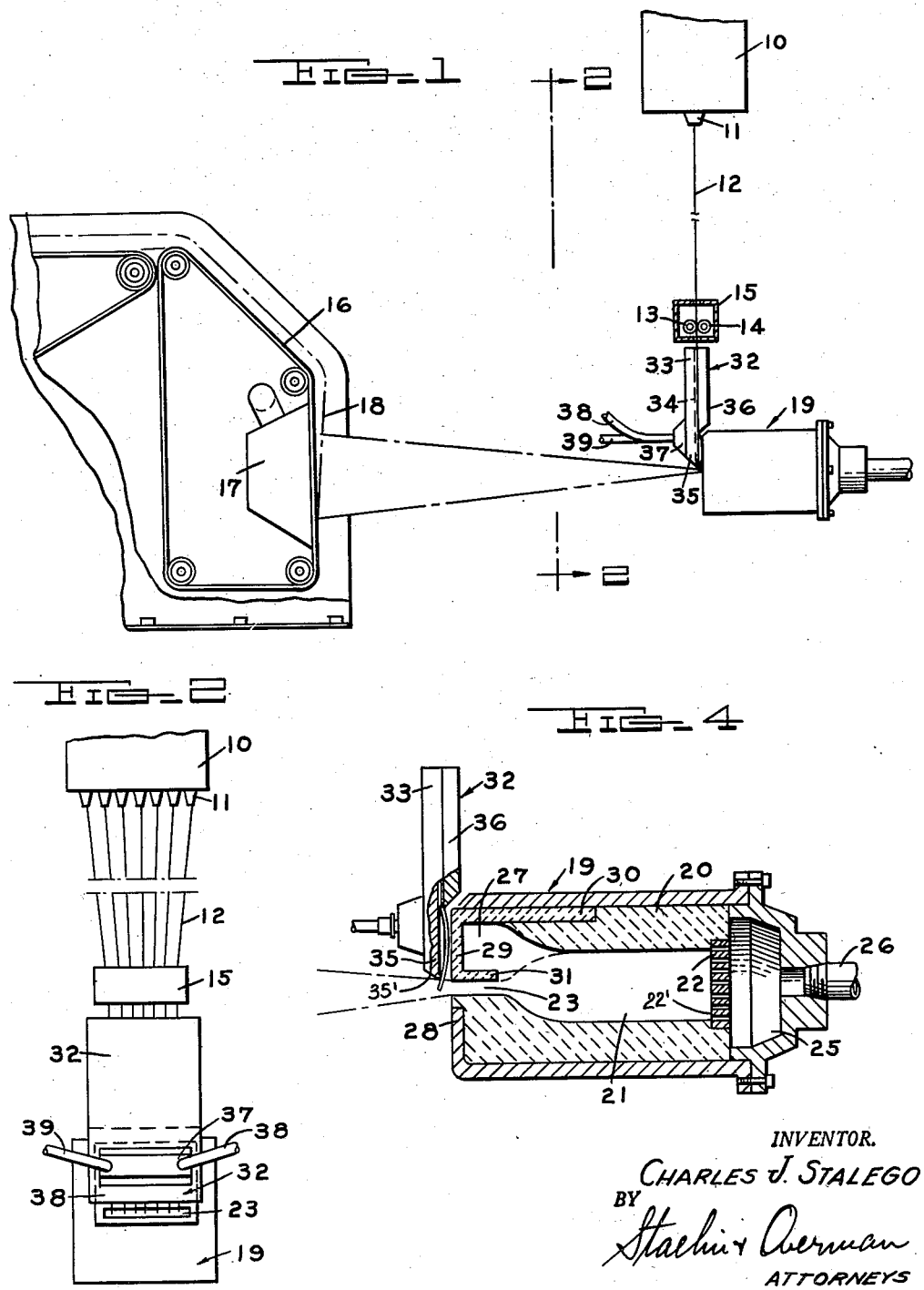
INVENTOR.
CHARLES J. STALEGO
BY
ATTORNEYS Aug. 19, 1952  C. J. STALEGO  2,607,075
METHOD AND APPARATUS FOR PRODUCING FINE GLASS FIBERS
Filed March 28, 1947
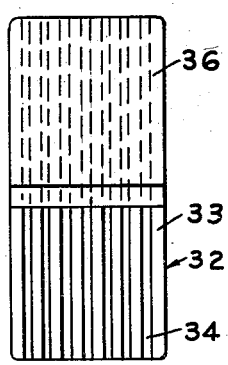
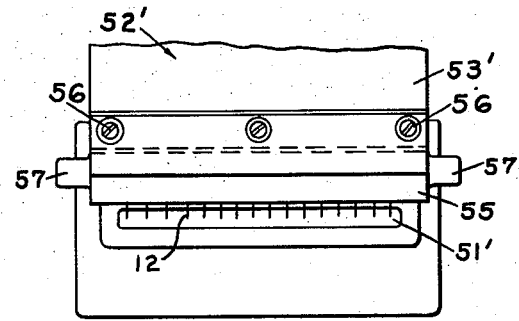
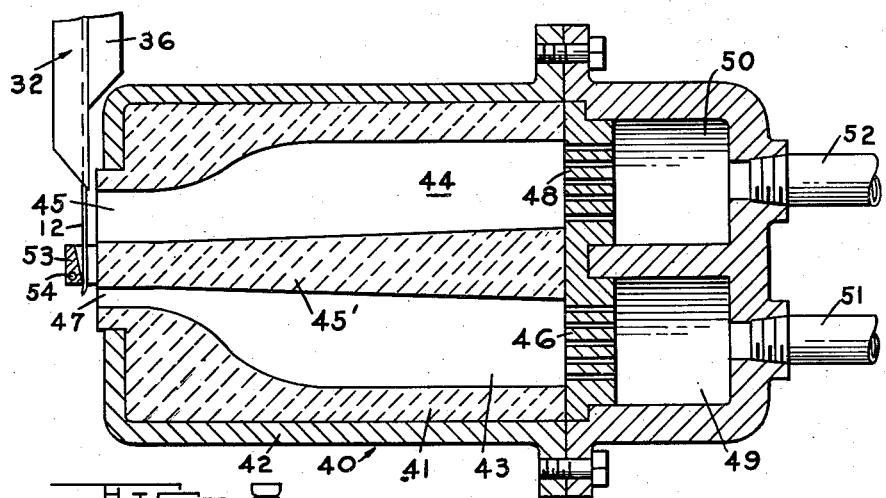
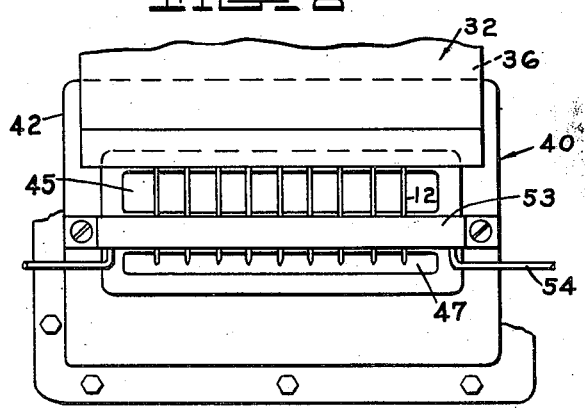
INVENTOR.
CHARLES J. STALEGO
BY
Stachin & Overman
ATTORNEYS

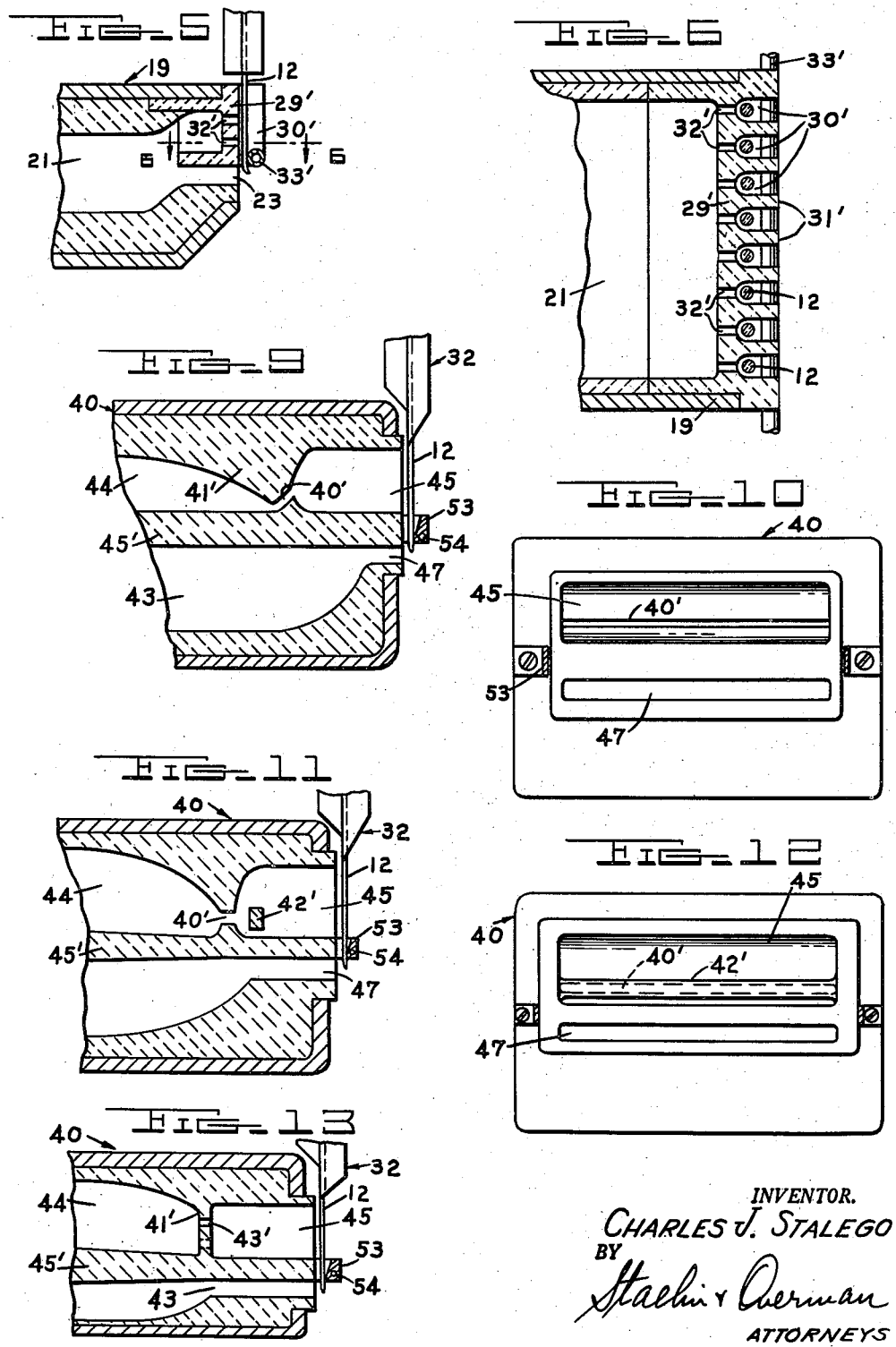

Aug. 19, 1952 C. J. STALEGO 2,607,075
METHOD AND APPARATUS FOR PRODUCING FINE GLASS FIBERS
Filed March 28, 1947 4 Sheets-Sheet 4
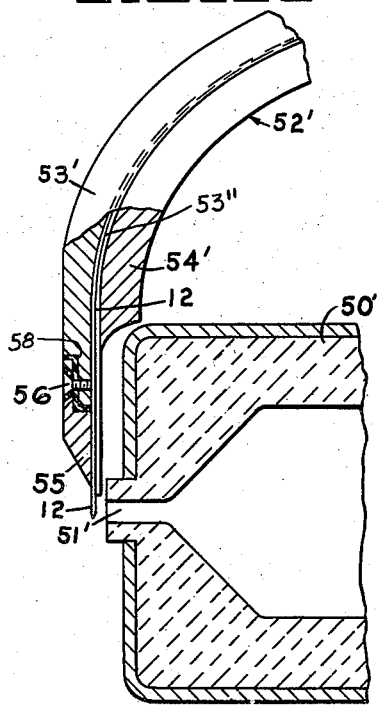
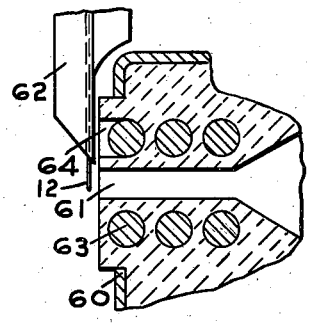
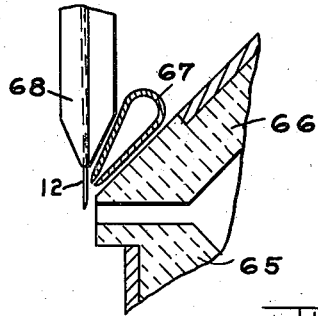
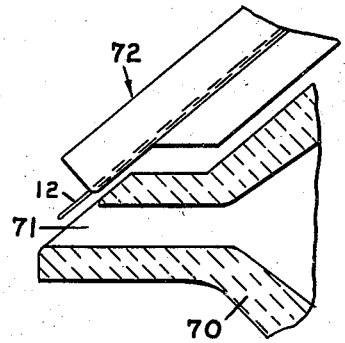
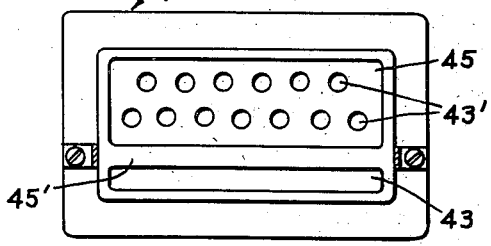
INVENTOR.
CHARLES J. STALEGO
BY
ATTORNEYS Patented Aug. 19, 1952

2,607,075

UNITED STATES PATENT OFFICE 2,607,075

METHOD AND APPARATUS FOR PRODUCING FINE GLASS FIBERS

Charles J. Stalego, Newark, Ohio, assignor to Owens-Corning Fiberglas Corporation, a corporation of Delaware Application March 28, 1947, Serial No. 737,934

25 Claims. (Cl. 18—2.5)

This invention relates generally to an improved method and apparatus for making fibers from a vitreous or heat softenable material, such for example, as glass.

This application is a continuation-in-part of my copending application Serial No. 616,863, filed September 17, 1945, now forfeited.

Glass fibers as small as one micron and even less have been successfully produced by feeding a small rod or primary filament of glass into a high velocity blast of high temperature gases and melting and attenuating the advancing end of the filament by the heat and force of the blast. The melting and attenuating blast may be produced by burning a fuel and air mixture in a confined space or chamber and discharging the products of combustion from the chamber through an orifice restricted to impart an extremely high velocity to the products of combustion as they pass through the orifice.

In actual practice the rate of feed of the filament into the blast is so determined with respect to the temperature of the blast and diameter of the filament that the advancing end of the filament is melted in the blast and carried away by the blast in the form of a stream while the end of the stream remains anchored to the filament. In instances where the glass primary filament is fed into the blast along a path normal or substantially normal to the blast, the rate of feed of the filament and temperature of the blast are regulated to maintain the portion of the filament within the blast at sufficient rigidity to resist the attenuating force of the blast at the area of departure of the stream being attenuated so that the stream is drawn out by the force of the blast into a fiber of the required size.

It follows from the above that the diameter of the primary filament fed into the blast, the speed or rate of feed of the primary filament and the temperature of the blast in the zone receiving the primary filament are factors which have an effect on the rate and amount of fibers attenuated. Each factor or any combination thereof may, of course, be varied within certain limits to produce a variety of results in the size and amount of fibers formed.

One problem encountered in producing fibers by the above or an equivalent process is to provide a blast of sufficient temperature to quickly melt the advancing ends of the filaments as they are fed into the blast and, at the same time, impart sufficient velocity to the blast to attenuate the molten material into fine fibers. The velocity of the blast may be increased by severely restricting the cross sectional area of the burner outlet opening, but such practice results in a blast having a proportionately reduced depth adjacent the burner, and as a result, reduces the melting time for filaments fed at a given rate into the blast.

In accordance with this invention the above problem is overcome by preheating the primary filaments just prior to introducing the filaments to the blast. Thus melting of the filaments by the blast is facilitated and the cross sectional area of the burner discharge opening may be reduced to increase the velocity of the blast.

Preheating of the primary filaments is especially advantageous in equipment where the filaments are fed into the blast along a path extending transversely to the direction of the blast. In an installation of the above type, the period of time available for melting the advancing end of the filament is limited by the thickness of the blast, the rate of feed of the filament into the blast and by the diameter of the filament. The depth of the blast is limited by the width of the burner discharge opening which should be as narrow as practical in order to impart a high velocity to the blast. Moreover the size and rate of feed of the primary filament should be as great as possible in order to produce the maximum amount of secondary fibers in the shortest possible time.

By preheating the primary filaments just prior to introducing the same into the blast, the melting time is reduced permitting the use of a more restricted burner discharge opening and thereby obtaining an increase in the rate of attenuation. Also the diameter and/or the rate of feed of the primary filaments may be increased without increasing the size of the secondary fibers.

A more detailed object of this invention is to preheat the primary filaments prior to introducing the same to the attenuating gaseous blast by directing the filaments in close or in heat conducting relation to the wall portion of the blast-producing burner and by heating this wall portion with the products of combustion within the burner.

Another object of this invention is to preheat the primary filaments by electrical heating elements incorporated in either the filament guide or in the wall of the burner adjacent the delivery end of the guide. In the latter instance the heating element may also encircle the discharge opening or passage in the burner, so as to supply additional heat to the products of combustion flowing through the opening and thereby tends to increase the velocity of the gaseous blast.

Still another feature of this invention is to preheat the glass filaments as the latter approach the attenuating blast with the products of combustion discharged from a secondary burner chamber at a temperature and velocity substantially less than the temperature and velocity of the attenuating blast. In practice the temperature of the preheating gas is merely sufficient to heat the primary filaments to a temperature below the softening point of the glass and the velocity of the gas is so slight that it does not disturb the position of the filaments relative to the burner.

A further object of this invention is to locate a small burner between the filament guide and the discharge opening for the attenuating blast in a position to direct a flame on the filaments as they approach the blast.

A still further object of this invention is to provide means for cooling the primary filaments as the latter are about to be fed into the blast, so that the temperature of the filaments may be controlled to a point sufficiently below the softening temperature of glass to enable the filaments to resist the force of the blast and to prevent sticking of the filaments to the adjacent wall of the burner or guide.

Still another object of this invention is to preheat the glass filaments by feeding the same into the attenuating blast at an angle to the blast so that a greater length of the primary filaments are subjected to the heat of the blast. The angle of inclination of the filament path relative to the blast may be varied depending upon the final fiber size desired.

The foregoing as well as other objects will be made more apparent as this description proceeds, especially when considered in connection with the accompanying drawings, wherein:

Figure 1 is a diagrammatic side elevational view of apparatus embodying the features of this invention;

Figure 2 is a front elevational view of the apparatus shown in Figure 1;

Figure 3 is an elevational view of the filament guide;

Figure 4 is a longitudinal sectional view through the burner and showing the filament guide in operative relation thereto;

Figure 5 is a sectional view showing a modified form of apparatus;

Figure 6 is a sectional view taken on the line 6—6 of Figure 5;

Figure 7 is a longitudinal sectional view through a modified form of apparatus;

Figure 8 is a front elevational view of the construction shown in Figure 7;

Figure 9 is a longitudinal sectional view similar to Figure 7 showing a modified form of burner construction;

Figure 10 is a front elevational view of the embodiment shown in Figure 9;

Figure 11 is a view similar to Figure 9 showing a further modification;

Figure 12 is a front elevational view of the construction shown in Figure 11;

Figure 13 is a longitudinal sectional view through another type of burner construction;

Figure 14 is a front elevational view of the construction shown in Figure 13;

Figure 15 is a fragmentary sectional view of another embodiment of this invention;

Figure 16 is a front elevational view of the apparatus shown in Figure 15;

Figure 17 is a sectional view through still another embodiment of this invention;

Figure 18 is a fragmentary sectional view of a further modification of this invention; and Figure 19 is a fragmentary sectional view of a still further modification of the invention.

In general all of the various embodiments of this invention to be presently described in detail are concerned with the production of fibers from heat softenable material by the action of a high temperature, high velocity blast. In each instance the required blast is obtained by burning a gaseous fuel mixture in a confined space or chamber and by discharging the products of combustion from the chamber through a restricted discharge opening or passage.

More particularly, the present invention concerns itself with the production of glass fibers of given size from glass filaments by feeding the filaments in a solidified or substantially solidified state into the blast or the products of combustion discharging from the burner chamber. The glass filaments are fed into the blast crosswise of the direction of flow of the blast immediately adjacent the delivery end of the discharge opening in order to take advantage of the maximum temperature and velocity of the blast. The temperature of the blast is sufficiently higher than the melting point of the glass in the filaments to melt the advancing end of the filaments while the latter are in the blast. The molten glass at the advancing ends of the filaments is carried away in the form of streams, and the velocity of the blast is sufficiently high to attenuate the streams into fibers of the specified size.

The rate of feed of the glass filaments into the blast and the temperature of the blast are such or are regulated to maintain the portions of the filaments within the blast at sufficient rigidity to resist the attenuating force of the blast. Thus the portions of the filaments adjacent the melted ends are not bent to any appreciable extent by the force of the blast and, as a result, the streams of molten glass are more effectively drawn out into fine uniform glass fibers. This process enables producing glass fibers of from one micron or less to two and one-half microns or more in diameter, depending upon the diameter of the filaments introduced to the blast, the rate of feed of the filaments into the blast and the temperature of the blast. Each of these factors or any combination thereof may be varied to produce a variety of results in the size and quantity of fibers formed.

The width of the discharge opening or passage in the burner chamber must be relatively narrow in order to insure obtaining a blast of the products of combustion having the required or desired velocity. As a consequence the width of the blast at the zone into which the filaments are fed is correspondingly narrow, and only a relatively small space is available for melting the advancing ends of the filaments. This introduces a limitation on the size of the primary filaments and/or the rate of feed of the latter fibers into the blast, and accordingly, affects either the size or quantity of fibers produced.

To overcome such limitations, the present invention provides for preheating the primary filaments prior to introducing the latter into the blast. In practice the filaments are preheated to a temperature below the softening temperature of the glass, so that the advancing ends of the filaments will not be appreciably bent in the direction of flow of the blast as they are fed into the latter. Overheating of the primary filaments by the preheating means is guarded against by means for cooling the filaments just before they enter the attenuating blast. In any case the filaments are introduced into the attenuating blast at an elevated temperature in order to insure melting the advancing ends of the filaments before the latter are projected entirely through the blast. As a result the rate of feed of the primary filaments into the attenuating blast and/or the size of the primary filaments may be increased, depending largely upon the size of the final fiber desired.

One highly successful method of producing the primary filaments is shown diagrammatically in Figure 1 of the drawings. In detail the reference character 10 indicates a glass feeder or bushing which may be in the form of a long, relatively narrow trough, having a plurality of feeding orifices in its bottom wall. Glass cullet or glass batch is fed to the bushing in any suitable manner and is heated while in the bushing to a molten condition. The molten glass flows from the orifices 11 in small streams which are attenuated to form primary filaments or fibers 12 by means of coacting feed rolls 13 and 14 located a distance from the bushing 10 sufficient to assure cooling of the filaments or fibers to solidification before engagement by the rolls. The feed roll 13 may be driven by an electric motor 15 indicated diagrammatically in Figure 1 of the drawings.

The primary filaments leaving the cooperating feed rolls are fed or projected into the gaseous attenuating blast briefly discussed above. The temperature of the attenuating blast is very high, being in the neighborhood of 2900° F., and the velocity of the blast is not limited by the speed of flame propagation. The blast thus provides not only sufficient heat to raise the primary glass fibers to attenuating temperature, but also provides a very high rate of attenuation of the molten glass to form fine secondary fibers. As the secondary fibers are formed, they are carried through the atmosphere by the blast and are deposited on a suitable foraminous conveyor 16 that is moved across the path of the blast-borne fibers. A suction chamber 17 is preferably disposed at the rear side of the conveyor 16 and is arranged to extend over the deposition zone of the fibers and thereby build up a unitary mat 18.

As previously stated, the high velocity of the blast is obtained by burning a combustible gaseous mixture in an enclosed chamber and exhausting the products of combustion through a restricted orifice which guides and accelerates the gases to form an intensely hot, high velocity blast. The type of combustible gas used may be of any suitable kind, but for reasons of economy, it is preferably an ordinary fuel gas, such as natural or manufactured fuel gas. This gas is mixed with the proper amount of air by means of the orthodox air and gas mixers. The gas and air mixture is taken from the mixer at moderate pressure of approximately one to five pounds per square inch, but may be considerably higher if desired, and is led through an ordinary conduit to an enclosed ignition chamber where ignition of the gaseous mixture takes place.

Referring to Figure 4 of the drawings, it will be noted that one type of apparatus is illustrated for igniting the gaseous mixture to create the required attenuating blast. This apparatus comprises a burner 19 having a body 20 of refractory material and having a combustion chamber 21 therein. One end of the combustion chamber terminates at the perforated wall 22 having a plurality of small orifices extending therethrough and the other end of the chamber is provided with a wall 28 having a restricted outlet or discharge passage 23 therein. The refractory body may be surrounded by a sheet metal shell which extends past one end of the body to form an inlet chamber 25 between the end of the shell and the perforated wall 22. A suitable conduit 26 connects with the shell to feed the combustible gaseous mixture into the inlet chamber 25. The gaseous mixture enters the inlet chamber 25 and passes through the orifices 22' in the wall 22 where it ignites and burns with a resulting high degree of expansion.

During operation, the walls of the chamber 21 are heated by the burning gas and the hot walls tend to increase the rate at which the gas entering the chamber burns. The resulting high rate of combustion causes a great expansion of the products of combustion which, as they pass through the outlet passage 23, are accelerated into a very high velocity blast of intense heat. The aim is to feed as much gaseous mixture into the chamber 21 as possible without causing the combustion to become unstable or to take place at the outside of the chamber or to cease altogether.

The outlet passage 23 is elongated and is substantially less in cross sectional area than the chamber 21, so that the products of the combustion taking place within the chamber are accelerated as they pass through the opening or passage 23 to provide a blast of the gases moving at a very high velocity. In this connection, it may be pointed out that the cross sectional area of the passage 23 may be varied to some extent relative to the cross sectional area of the chamber 21, depending upon the heat required in the blast leaving the outlet passage. Passages of greater cross sectional area relative to the cross sectional area of the chamber 21 permit burning a greater amount of gas and result in greater heat of the blast, but also cause a decrease in the velocity of the blast. Preferably, however, the cross sectional area of the outlet passage 23 is no greater than necessary to obtain in the blast the heat required to raise the glass to the attenuating temperature. The best relation of the cross sectional area of the passage 23 to the cross sectional area of the chamber 21 may be determined by simple trial, but in most cases will be found to be within the range of 1:8 or 1:4. This arrangement provides for obtaining the high velocity of the blast coupled with sufficient heat of the blast to quickly melt the glass to be attenuated.

Referring again to Figure 4 of the drawings, it will be noted that the refractory lining 20 of the combustion chamber 21 is shaped at the front end of the burner to form a pocket 27 which lies adjacent the front wall 28 of the burner above the discharge passage 23. The pocket 27 communicates with the combustion chamber 21 and the portion 29 of the front wall 28 above the discharge opening 23 is formed of a heat resistant material characterized in that it provides a very high degree of heat radiation. The portion of the burner wall above the discharge opening 23 may be formed by a separate member 29 having a rearwardly extending flange 30 at the upper edge anchored to the adjacent wall of the shell 24 and having a relatively short flange 31 projecting rearwardly from the bottom edge thereof. The flange 31 forms the top wall of the discharge passage 23.

It follows from the foregoing that the member 29 is heated by the products of combustion in the chamber 21 to a very high temperature and since the member 29 is relatively thin, considerable heat is radiated from the latter. In the present instance, the heat radiated and conducted from the member 29 is used to preheat the primary filaments 12 just before the latter are projected into the gaseous blast issuing from the passage 23. The filaments 12 are heated to a temperature just below the softening temperature of the glass which may be in the neighborhood of 1200° F. In any case care is taken to maintain the temperature below a point where the force of the attenuating blast would bend the advancing end of the filament in the direction of flow of the blast. In other words, the filaments are maintained sufficiently rigid to withstand the force of the attenuating blast and to permit the kinetic forces of the blast to draw out streams of glass from the respective filaments while the streams remain anchored to the filaments.

Although the extent of preheating of the filaments is limited, nevertheless the allowable degree of preheating is highly beneficial in that it assures melting the advancing ends of the filaments 12 by the attenuating blast even in installations where the width of the burner discharge opening 23 and, as a consequence, the depth of the blast is at a minimum. The preheating of the filaments also enables producing finer fibers with a given diameter of primary filament and with a given rate of feed of the primary filaments into the attenuating blast. It also offers the possibility of increasing the production of a given size apparatus by enabling the rate of feed of the primary filaments into the blast to be increased and/or by permitting primary filaments of greater diameter to be used without the danger of projecting the filaments completely through the blast before the advancing ends of the filaments are melted. In addition, fibers of large size may be produced on a production basis by employing filaments of substantial diameter without correspondingly increasing the width of the burner discharge opening 23.

In the present instance, the primary fibers are guided or directed into conducting relationship to the member 29 by a guide 32 supported below the coacting feed rolls 13 and 14. The guide 32 comprises a plate 33 elongated in the direction of the path of travel of the primary fibers leaving the feed rolls and having a plurality of laterally spaced grooves 34 corresponding in number to the number of primary fibers. The lateral spacing of the grooves 34 is such that these grooves respectively receive the primary fibers leaving the feed rolls and the grooves extend for the full length of the plate 33. The lower end portion 35 of the plate 33 extends downwardly in juxtaposition to the member 29 and terminates substantially flush with the top wall 31 of the passage 23. It is pointed out in this connection that the length of the passage 23 corresponds to the width of the plate 33 so that all of the primary fibers leaving the delivery end of the plate or guide are projected into the gaseous blast issuing from the passage 23.

The guide 32 is provided with a cover 36, which is secured to the rear face of the plate 33 over the grooves 34 to enclose the primary fibers. The lower end of the cover 36 terminates short of the portion 35 of the plate 33 to expose the primary fibers directly to the heat radiating from the member 29 at the front wall of the burner 19. Due to the fact that the portion 35 of the guide or plate 33 extends in such close proximity to the member 29 on the burner 19, this plate is subjected to extremely high temperatures and, if desired, may be cooled by providing a jacket 37 at the front side of the plate 33. A cooling medium from a suitable source may be conveyed to the jacket 37 through an inlet conduit 38 and discharged from the jacket through an outlet conduit 39.

As the primary fibers are advanced along the guide 32, the pressure of the blast on the fiber tips and using the edge 35' of the guide as a fulcrum causes the fibers to bow rearwardly between the edge and the cover 36 in direct heat conducting relation to the member 29. Thus the primary fibers are preheated to just below the softening point of the glass before they are introduced or projected into the intensely hot, high velocity blast issuing from the passage 23.

The construction shown in Figures 5 and 6 of the drawings embodies a burner similar in construction to the burner shown in Figure 4, and accordingly, the same reference characters are used to indicate corresponding parts. The front wall 29' of the burner differs from the corresponding wall 29 of the burner shown in Figure 4 of the drawings in that it is formed with a plurality of grooves 30' corresponding in number to the number of primary filaments 12 and adapted to respectively receive the filaments as the latter are fed along the wall 29' into the blast of the products of combustion discharged from the burner chamber 21 through the restricted orifice 23. The opposite side walls 31' of the grooves form heat radiating fins and respectively project along opposite sides of the filaments, so that the latter are substantially enclosed by the walls of the groove. This construction is highly advantageous in that it provides for more uniformly preheating the filaments 12 just prior to introducing the latter to the intensely hot high velocity blast.

If desired each of the grooves 30' may communicate directly with the interior of the combustion chamber 21 of the burner through a series of openings 32' formed in the wall 29'. Thus the products of combustion are permitted to pass directly into the grooves 30' to supply additional heat. Displacement of the filaments 12 from the grooves 30' by the force of the blast may be prevented by providing a guide or tube 33' extending transversely of the grooves 30' along the lower ends of the latter. Thus the tube is positioned adjacent the top wall of the discharge opening 23 and resists any tendency of the force of the blast to blow the filaments out of the grooves 30'. In some cases it may be desirable to circulate a cooling medium through the tube 33' in order to prevent any possibility of the filaments adhering to the tube and to enable controlling the temperature of the filaments introduced to the blast.

Another highly successful type of apparatus which may be employed to preheat the primary filaments just prior to introducing the filaments into the attenuating blast is shown in Figures 7 and 8. This embodiment of the invention differs principally from the one previously described in the construction of the burner, which is indicated in Figures 7 and 8 by the reference character 40. In detail the burner 40 comprises a body 41 of refractory material, and a metal casing 42 for enclosing the body. The body 41 is formed with two combustion chambers 43 and 44 positioned adjacent one another and separated from each other by a partition 45'. In Figure 7 of the drawings, the combustion chamber 44 is located above the combustion chamber 43, and is provided with a restricted outlet opening or passage 45.

The rear end of the combustion chamber 43 terminates at a perforated wall 46 having a plurality of small orifices extending therethrough, and the other end of the chamber is provided with a wall having a restricted outlet or discharge passage 47 therethrough. The rear end of the combustion chamber 44 may also be provided with a perforated wall 48 similar to the wall 46 and positioned adjacent the latter. The metal casing 42 is formed with a pair of inlet chambers 49 and 50 respectively registering with the chambers 43 and 44. Suitable conduits 51 and 52 are respectively connected to the inlet chambers to enable the selected combustible gaseous mixture to be fed into the inlet chambers. As in the first described form of the invention, the gaseous mixture enters the inlet chamber 49, and passes through the orifices in the wall 46 where it ignites and burns with a resulting high degree of expansion. During the burning operation the walls of the chamber 43 are heated by the products of combustion and tends to increase the rate at which the gaseous mixture burns in the chamber 43. The discharge opening 47 is restricted in width to correspond to the discharge passage 23 in the burner 19, and as a result, the products of combustion are accelerated into a very high velocity blast of intense heat as they are discharged through the passage 47. Thus the burner chamber 43 acts in the same manner as the burner chamber 21 previously described to produce an intensely hot attenuating blast.

At the same time the gaseous mixture is introduced into the combustion chamber 43 from the inlet chamber 49, gaseous mixture is also introduced into the combustion chamber 44. The gaseous mixture entering the chamber 44 is ignited, and the products of combustion are discharged through the opening 45. The opening 45 is not restricted to any great extent, so that the products of combustion are discharged from the chamber 44 at a relatively low velocity, and provide a gentle or soft flame.

The fiber or filament guide may be identical to the one defined with some particularity in connection with the first embodiment of this invention, and is indicated by the same reference numeral. This guide terminates at the top edge of the discharge opening 45, so that the filaments are fed across the discharge opening 45 before being introduced into the attenuating blast issuing from the discharge opening 47. Thus the filaments are heated by the relatively soft flame issuing from the discharge passage 45 before they are introduced into the attenuating blast.

The degree to which the primary filaments are heated by the preheater flame is regulated in relation to the rate of feed of the filaments, and the diameter of the latter, so that the filaments are heated to a temperature just below the softening point of the glass. As in the first described form of the invention, it is desirable to maintain the advancing ends of the filaments sufficiently rigid to withstand the force of the attenuating blast without appreciable bending in the direction of flow of the blast. This feature may be assured by providing a strip or plate 53 on the burner 42 directly opposite the front side of the dividing wall 45'. The plate 53 is spaced from the dividing wall and acts as a guide for the ends of the filaments as the latter are projected into the attenuating blast. The plate 53 also prevents any possibility of deflection of the filaments by the products of combustion flowing through the discharge opening 45 in the chamber 44, and since the temperature of the filaments entering the guide 53 is below the softening temperature of the glass, there is no danger of the filaments sticking or adhering to the guide.

If desired, provision may be made for cooling the plate 53 with either air or water by forming an opening or jacket 54 in the plate through which the cooling medium may be circulated. The circulation of cooling medium through the plate 53 would, of course, serve to cool the primary filaments just before the latter are projected into the attenuating blast, and overheating of the filaments by the preheater flame may be compensated for regulating the extent of cooling of the plate 53. Thus it is possible to obtain the numerous advantages of preheating the filaments prior to introducing the latter into the attenuating blast while maintaining the filaments sufficiently rigid to withstand the force of the attenuating blast, and thereby permit streams of molten glass to be attenuated or drawn out while anchored to the respective filaments. All of the advantages discussed in some detail in connection with the first described form of the invention are obtainable by the embodiment of the invention shown in Figures 7 and 8 of the drawings.

With the double chamber type burner previously described, the pressure existing in the preheating combustion chamber 44 is, of course, less than the pressure in the attenuating combustion chamber 43. Under some conditions of operation this unbalanced pressure acting on opposite sides of the common wall 45' between the chambers has a tendency to cause this wall to bow upwardly. This tendency may be overcome by restricting the passage of the products of combustion from the chamber 44 adjacent the outlet opening 45 to such an extent that a pressure is built up in the preheating chamber 44 sufficient to counterbalance the pressure existing in the attenuating combustion chamber 43.

The foregoing balanced or substantially balanced pressure condition may be obtained without correspondingly increasing the velocity of the products of combustion issuing from the preheating chamber 44. One way in which this may be accomplished is shown in Figures 9 and 10 of the drawings, wherein a burner similar to the burner 40 is shown, except that the preheating chamber 44 is fashioned with a restriction 40' in the inner side of the discharge opening 45. In detail the preheating chamber 44 is fashioned with a partition 41' spaced inwardly from the discharge opening 45 and having the passage 40' formed therethrough. It will be noted that the passage 40' is inclined upwardly in order to direct the products of combustion against the top wall of the opening 45. This diffuses the gases discharged by the passage 40' and prevents impinging the latter against the filaments with any great force. Moreover, since the passage 40' is located inwardly of the discharge opening 45, it follows that the gases expand within the opening 45 prior to contacting the filaments 12. The passage 40 may have a cross sectional area approximating the cross sectional area of the discharge opening 47 for the attenuating chamber 43, so that the pressure acting on opposite sides of the common wall 45' is substantially balanced.

Another arrangement for accomplishing the foregoing is shown in Figures 11 and 12 of the drawings. This construction differs principally from the one shown in Figure 9 in that the restriction 40' extends substantially axially of the preheating combustion chamber 44, and the products of combustion issuing from the passage are diffused by a baffle 42'. The baffle 42' is located in the discharge opening 45 directly in advance and opposite the passage 40'.

Still another construction for effecting the above results is shown in Figures 13 and 14. In this construction the wall 41' separating the preheating chamber 44 from the outlet opening 45 is formed with a plurality of relatively small orifices 43'. The combined area of the orifices 43' is such as to enable obtaining a pressure in the preheating chamber 44 which approximates the pressure in the attenuating chamber 43, so that the forces applied to opposite sides of the common wall 45' are more or less equalized. As the products of combustion are discharged through the orifices 43' into the outlet opening 45, they are expanded with a consequent reduction in velocity.

Referring now to the embodiment of the invention shown in Figures 15 and 16 of the drawings, it will be noted that the burner 50' is similar to the burner 19 except that the pocket 27 is omitted. The discharge opening 51' of the burner is restricted to correspond to he discharge passage 23 of the burner 19 in order to produce an attenuating blast having the same characteristics defined at some length above.

The glass filaments 12 are fed into the blast issuing from the discharge opening 51' along a guide 52' comprising a plate 53' and a cover 54'. The plate 53' is formed with a series of laterally spaced grooves 53'' for respectively slidably receiving the primary filaments 12 and the lower end thereof extends along the front side of the burner 50' above the discharge opening 51'. A tip 55 formed of a heat resistant material such, for example, as platinum is removably secured to the lower end of the plate by suitable fastener elements 56 and the rear face of the tip 55 is formed with grooves aligned with the grooves in the plate 53' to provide extensions of the latter grooves. The lower end of the tip 55 terminates at a point substantialy flush with the top edge of the discharge opening 51' and cooperates with the plate 53' to guide the glass primary filaments into the attenuating blast. It will be noted from Figure 15 of the drawings that the cover 54' terminates at the lower end at the top of the burner 50' to expose the filaments to any heat radiating from the adjacent burner wall and to provide for feeding the filaments into the blast immediately adjacent the discharge opening 51'.

The opposite ends of the tip 55 are formed with terminals 57 and the latter are suitably electrically connected in an electric circuit (not shown). The plate 53' is electrically insulated from the tip 55 by suitable insulating material 58 surrounding the fastener elements and arranged between the plate and tip. The current passing through the tip 55 heats the latter and this heat is transferred to the primary glass filaments advancing along the tip to the attenuating blast. The heating current is regulated to preheat the primary glass filaments to a temperature just below the softening temperature of the glass or to a temperature which enables the filaments to withstand the force of the attenuating force without bending in the direction of flow of the blast.

The burner 60 shown in Figure 17 of the drawings may be identical to the burner 50' except that the front wall is somewhat thicker and the restricted discharge passage 61 if of greater length than the corresponding opening 51' in the burner 50'. A filament guide 62 similar to the guide 32 may be employed to guide the primary filaments into the blast issuing from the discharge passage 61.

Electrical resistance members 63 commonly known in the trade as "Glowbars" are built into the burner 60 around the discharge passage 61 and are connected to an electric circuit (not shown). The bars 63 are usually made of a mixture of carbon, such as graphite and clay so as to be readily heated by the passage of current therethrough. The bar extending along the top of the discharge passage is exposed to the atmosphere through a recess 64 formed in the front wall of the burner and serves to heat the primary filaments as the latter are fed past the recess into the attenuating blast issuing from the passage 61.

In installations where a plurality of bars are provided in side by side relation at opposite sides of the burner discharge opening 61, they also serve to elevate the temperature of the products of combustion passing through the discharge opening. As a result expansion of the products of combustion is increased, and the velocity of the gaseous blast is correspondingly increased.

Figure 18 illustrates still another form of apparatus that may be used to preheat the primary glass filaments just prior to feeding the latter into the attenuating blast. The attenuating blast is produced by a burner 65 similar to the burner 51' shown in Figure 15 of the drawings, except that the top wall 66 is tapered or sloped rearwardly to provide sufficient clearance for a relatively small flame type burner 67 between the main burner 65 and the usual filament guide 68. The burner 67 is positioned to direct the flame downwardly to enable contacting the flame with the primary glass filaments just before the latter are fed into the attentuating blast issuing from the discharge opening or passage 69 in the burner 65.

A fuel mixture similar to the one used in the main burner 65 may be employed in the burner 67 or the latter may be of Bunsen or ribbon type. In any case the burner 67 serves to preheat the primary filaments to a temperature just below the softening point of the glass as the filaments are introduced into the attenuating blast and this is advantageous for the reasons discussed at some length above.

Preheating the primary filaments by any one of the above types of apparatus has the effect of increasing the heating time of the filaments. This effect may also be obtained by feeding the primary glass filaments into the blast at an angle to the blast so that a greater length of the filaments is exposed to the heat of the blast.

As shown in Figure 19 of the drawings, a burner 70 similar to the burner 51' produces the attenuating blast and the primary glass filaments are fed across the discharge opening or passage 71 in the front wall of the burner along a guide 72 similar to the guide 32. The front wall of the burner is chamfered or tapered rearwardly at an angle to the bottom wall of the burner, and the guide 72 is correspondingly inclined to guide the primary filaments across the opening 71 in a plane substantially parallel to the plane of the opening or front wall of the burner. Thus a greater length of the primary filaments is subjected to the blast issuing from the opening 71 and the heating time is thereby increased. The increase in the heating time for a given rate of filament travel depends on the angle of injection of the filaments into the blast and may be varied from 45° or less to 90° or more. Other things being equal, the angle of projection of the filaments into the blast actually determines the diameter of the final fibers produced. For example, fibers approximating .00025" have been made with apparatus wherein the filaments are projected into the attenuating blast at an angle of 45° or 50°. Where smaller final fibers of one micron or less are desired, the angle is increased to 85° or 95°. The effects obtained are somewhat similar to those resulting from preheating the primary filaments, as in reality the filaments are heated before the advancing ends thereof reach the center of the attenuating blast.

I claim:

1. The process of making glass fibers which comprises burning a combustible mixture of gases in a chamber and discharging the products of combustion through a restricted opening in the form of a high temperature, high velocity blast, feeding a glass filament crosswise of the blast and into the blast immediately adjacent the discharge opening, softening the advancing end of the filament by the heat of the blast and attenuating the molten glass by the force of the blast, and heating the filament just prior to feeding the latter into the blast to a temperature approximating but below the softening temperature of the glass.

2. The process of making glass fibers from a glass filament which comprises producing a gaseous blast having a temperature sufficient to melt the glass filament and moving the blast at a velocity sufficient to attenuate the molten glass into fibers, flowing a gaseous medium in the same general direction as the blast at a temperature sufficient to heat the filament to a point just below the softening temperature of the glass and at a relatively low velocity, and feeding a glass filament through the relatively low velocity gaseous medium and into the intensely hot high velocity blast.

3. The process of making glass fibers from a glass filament which comprises producing a gaseous blast of a temperature sufficient to melt the glass filament and moving the blast at a velocity sufficient to attenuate the molten glass into fibers, producing a flow of a gaseous medium in the same general direction as the blast at a temperature sufficient to heat the filament to a point just below the softening temperature of the glass and at a relatively low velocity, feeding a glass filament through the relatively low velocity gaseous medium and into the intensely hot high velocity blast, and cooling the filament as it passes from the low velocity gaseous medium to the high velocity blast.

4. Apparatus for producing glass fibers, comprising a burner having a chamber in which a combustible mixture of gases is ignited and having a wall formed of heat transferring material heated by burning the gaseous mixture in the chamber, a restricted outlet opening in said wall through which the products of combustion are discharged in the form of an intensely hot high speed blast, and means for feeding glass filaments in heat transferring relation to said wall and into the blast.

5. Apparatus for producing glass fibers from a glass filament, comprising a burner having a chamber in which a combustible mixture of gases is ignited and having a restricted opening in the front wall through which the products of combustion are discharged at a temperature sufficiently high to melt the glass filament and at a velocity sufficient to attenuate the molten glass into fibers, means for feeding a glass filament into the blast along a path extending in a direction transverse to the blast, and an electrically heated member for elevating the temperature of the filament to a point just below the softening temperature of the glass prior to introducing the filament to the blast.

6. Apparatus for producing glass fibers from a glass filament, comprising a burner having a chamber in which a combustible mixture of gases is ignited and having a restricted opening in the front wall through which the products of combustion are discharged at a temperature sufficiently high to melt the glass filament and at a velocity sufficient to attenuate the molten glass into fibers, means for feeding a glass filament into the blast along a path extending in a direction transverse to the blast, and an electrically heated member for guiding the filament into the blast.

7. Apparatus for producing glass fibers from a glass filament, comprising a burner having a chamber in which a combustible gaseous mixture is ignited and having a restricted opening in the front wall through which the products of combustion are discharged at a temperature sufficiently high to melt the glass filament and at a velocity sufficient to attenuate the molten glass into fibers, means for feeding a glass filament into the blast along a path extending in a direction transverse to the blast, an electric heating element embedded in the front wall of the burner at opposite sides of the restricted discharge opening, and an opening in said front wall exposing the filament to a part of the heating element just prior to movement of the filament into said blast.

8. The process of making glass fibers which comprises burning a combustible mixture of gases in a confined chamber having a restricted outlet opening in one wall through which the products of combustion are discharged in the form of an intensely hot high velocity blast, said wall having high heat transferring characteristics, feeding a glass rod into the blast along a path extending transversely to the direction of flow of the blast, softening the advancing end of the rod by the heat of the blast and drawing out the softened glass into fibers by the force of the blast, and preheating the rod prior to introducing the latter into the blast by causing the rod to pass in heat transferring relation to the wall aforesaid of the combustion chamber.

9. The process of making glass fibers which comprises introducing a combustible mixture of gases into a confined combustion chamber having in one wall thereof an outlet opening of substantially greater length than width, burning the combustible gaseous mixture within the chamber in sufficient quantity to produce an expansion therein sufficiently high to forcibly discharge the burned gases through the outlet opening in the form of a blast of substantially greater width than thickness and having a temperature in a zone exteriorly of the chamber exceeding the softening temperature of glass and a velocity in said zone high enough to attenuate the softened glass, feeding a plurality of rods of glass into the blast in said zone with the rods in side by side relationship in a row extending across the width of the blast, and progressively heating the ends of the glass rods just prior to introducing the advancing ends thereof into the blast to a temperature approaching but below that at which the glass will flow.

10. Apparatus for producing glass fibers comprising a burner having a chamber in which a combustible mixture of gases is ignited and having a wall heated by the combustion taking place within the chamber, a restricted outlet opening in said wall through which the products of combustion are discharged in the form of an intensely hot high velocity blast, an electrically heated surface spaced laterally outwardly from said wall, and means for feeding a rod of glass between said wall and the heated surface into said blast.

11. Apparatus for producing glass fibers comprising a burner having a chamber in which a combustible mixture of gases is ignited and having a wall heated by the combustion taking place within said chamber, a restricted outlet opening in said wall through which the products of combustion are discharged in the form of an intensely hot high velocity blast, a surface supported in lateral spaced relationship to said chamber wall, means for separately heating said surface, and means for feeding a rod of glass into said blast, said feeding means directing the rod along a path of travel extending between the separately heated surface and said chamber wall for heating the rod prior to its introduction into the blast.

12. Apparatus for producing glass fibers comprising a burner having a chamber in which a combustible mixture of gases is burned and having a wall heated by the combustion taking place within the chamber, an outlet opening in said wall through which the products of combustion are discharged in the form of an intensely hot high velocity blast, said outlet opening having a substantially greater length than width to provide a blast of substantially greater width than thickness, a surface supported directly opposite said wall in lateral spaced relationship thereto, means separate from said burner for heating said surface, and means for feeding a multiplicity of rods of glass into the blast with the rods extending in side by side relationship in a row extending across the width of the blast, and means for directing the rods of glass between the burner wall and the separately heated surface for heating the rods prior to introducing said rods into the blast.

13. Apparatus for attenuating glass to fine fibers comprising a burner including a chamber in which a combustible gaseous mixture is ignited and having a restricted outlet passage in one end wall, whereby a high speed blast of the products of combustion of the gaseous mixture is established at the outside of the burner, said end wall formed of heat transferring material adapted to radiate a high degree of heat, means for feeding primary glass fibers into the blast, and means for guiding the fibers in heat transferring relation to said wall of the burner and thereby preheat the fibers prior to introducing said fibers to the blast.

14. Apparatus for attenuating glass to fine fibers comprising means for feeding primary glass fibers along a predetermined path, a burner including a chamber in which a combustible gaseous mixture is ignited and having a wall formed of heat radiating material positioned immediately adjacent the path of travel of the primary fibers and adapted to radiate a high degree of heat therefrom, one edge of said wall defining one side of an elongated restricted opening through which a high speed blast of the products of combustion of the gaseous mixture is discharged into the atmosphere, and means directing the fibers into the blast including a guide extending along the surface of said wall to the discharge opening and having the delivery end extending parallel to the elongated discharge opening in said wall, said guide supporting said fibers in heat transferring relation with said radiant wall.

15. The process of making glass fibers from a glass filament which includes producing a gaseous blast of a temperature sufficient to heat the filament to a temperature approximating but below the softening temperature of the glass, of producing a second gaseous blast having a temperature sufficient to melt the glass filament and moving said second blast at a velocity sufficient to attenuate the molten glass into fibers, and successively feeding a glass filament through the first mentioned blast and into the high velocity attenuating blast.

16. The process of making glass fibers from a glass filament which comprises producing a gaseous blast having a temperature sufficient to melt the glass filament and moving the blast at a velocity sufficient to attenuate the molten glass into fibers, establishing a preheating zone for heating the filament to a temperature approaching but below the softening temperature of the glass, and feeding a glass filament successively through the preheating zone and into the high velocity gaseous blast.

17. The process of making fibers from glass which comprises advancing a rod of glass in the direction of its length, as it advances heating the rod progressively along its length to a temperature at which it is softened but below that temperature at which it will elongate substantially under the influence of attenuating forces acting on the rod, introducing the heated end of the rod into a blast of gases that are at a temperature above the attenuating temperature of the glass and that travel at a velocity sufficient to attenuate the rod, heating the advancing end of ths rod by the heat of the blast to a higher temperature at which the glass will flow under the influence of attenuating forces in said blast, and attenuating the heated material at the advancing end of the rod to form fibers by the force of the blast.

18. The process of making glass fibers which comprises advancing a rod of glass in the direction of its length, heating the rod progressively along its length as it advances to a temperature at which it is softened but below that at which the glass will elongate substantially under the influence of attenuating forces acting on the rod, directing an intensely hot high velocity blast across the path of travel of the rod, introducing the heated end of the rod into the blast from one side of the latter, heating the advancing end of the rod by the heat of the blast to a higher temperature at which the glass will flow under the influence of the attenuating forces in the blast, and attenuating the heated glass at the advanc- 19. The process of making glass fibers which comprises advancing a rod of glass in the direction of its length through a zone of high temperature, heating the rod progressively along its length as it advances through said zone to a temperature at which it will soften but below that at which the glass will elongate substantially under the influence of attenuating forces acting on the rod, directing an intensely hot high velocity gaseous blast in a direction across the path of travel of the rod, introducing the heated end of the rod into the blast, and heating the advancing end of the rod by the heat of the blast to a higher temperature at which the glass will flow under the influence of the attenuating forces in the blast and attenuating the heated glass at the advancing end of the rod to form fibers by the force of the blast.

20. The process of making glass fibers which comprises advancing a multiplicity of rods of glass in side by side relationship in the direction of their length, heating the rods progressively along their length as they advance to a temperature approaching but below that at which the heated glass will elongate substantially under the influence of attenuating forces acting on the rods, producing an intensely hot high velocity blast by burning a combustible mixture of gases and discharging the products of combustion in a direction extending across the path of travel of the rods, introducing the heated advancing ends of the rods into the products of combustion, heating the advancing ends of the rods to a substantially higher temperature by the heat of the burned gases, and drawing out the heated glass at the ends of the rods to form fibers by the force of the burned gases.

21. Apparatus for attenuating glass fibers comprising a burner including a chamber in which a combustible gaseous mixture is ignited and having a wall defining a portion of said chamber and permitting a high degree of heat radiation therefrom, one edge of said wall defining one side of a restricted outlet opening through which a high speed blast of the products of combustion of the gaseous mixture are discharged into the atmosphere, means for feeding primary glass fibers toward the blast in a direction extending transversely to the direction of movement of the blast, and a guide for the fibers extending along said heat radiating wall of the chamber to the restricted discharge opening and having the portion lying adjacent the wall open to expose the fibers to the heat radiating from said wall.

22. Apparatus for producing glass fibers comprising a burner having a chamber in which a combustible gaseous mixture is ignited and having a wall heated by burning the gaseous mixture in the chamber, a restricted outlet opening in said wall through which the products of combustion are discharged in the form of an intensely hot high speed blast, means for feeding a glass filament in heat transferring relation to said wall and into the blast, and heat radiating fins projecting from the wall at opposite sides of the filament to cooperate with said wall to heat the filament prior to introducing the latter to the blast.

23. Apparatus for producing glass fibers, comprising a burner having a chamber in which a combustible gaseous mixture is ignited and having a wall heated by burning the gaseous mixture in the chamber, a restricted outlet opening in said wall through which the products of combustion are discharged in the form of an intensely hot high speed blast, means for feeding glass filaments in side by side relationship transversely of the blast and along the outer face of the wall into the blast, and a plurality of heat radiating fins respectively projecting from the wall along opposite sides of the filaments to cooperate with the wall to preheat the filaments prior to introducing the latter to said blast.

24. Apparatus for producing glass fibers, comprising a burner having a chamber in which a combustible gaseous mixture is ignited and having a wall heated by burning the gaseous mixture in the chamber, a restricted outlet opening in said wall through which the products of combustion are discharged in the form of an intensely hot high speed blast, means for feeding glass filaments in side by side relationship transversely of the blast and along the outer face of the wall into the blast, a plurality of grooves in said wall for respectively receiving the filaments passing along the wall into the blast and communicating with the interior of the chamber through openings in said wall.

25 The process of making glass fibers which comprises feeding primary glass fibers at substantially right angles to a blast produced by burning a combustible gaseous mixture in a confined space and directing the products of combustion in a restricted path from the space and into the atmosphere for establishing a high speed and high temperature blast, preheating the primary fibers to a temperature approaching the softening point of the glass prior to introducing said fibers to the blast by subjecting the primary fibers to the heat radiating from said space, and attenuating the heat softened primary fibers by the heat and force applied to said fibers by the blast.

CHARLES J. STALEGO.

REFERENCES CITED

The following references are of record in the file of this patent:

UNITED STATES PATENTS

| Number | Name | Date |
|---|---|---|
| 1,157,984 | Herkenrath | Oct. 26, 1915 |
| 1,328,446 | Odam | Jan. 20, 1920 |
| 2,175,225 | Slayter | Oct. 10, 1939 |
| 2,227,357 | Martin | Dec. 31, 1940 |
| 2,457,777 | Holtschulte et al. | Dec. 28, 1948 |
| 2,499,218 | Hess | Feb. 28, 1950 |